United States Patent
Li et al.

(10) Patent No.: US 12,052,707 B2
(45) Date of Patent: Jul. 30, 2024

(54) DATA TRANSMISSION

(71) Applicant: ZTE Corporation, Guangdong (CN)

(72) Inventors: Xincai Li, Guangdong (CN); Yajun Zhao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 357 days.

(21) Appl. No.: 17/402,137

(22) Filed: Aug. 13, 2021

(65) Prior Publication Data
US 2021/0377981 A1 Dec. 2, 2021

Related U.S. Application Data

(63) Continuation of application No. PCT/CN2019/075109, filed on Feb. 14, 2019.

(51) Int. Cl.
*H04W 72/1268* (2023.01)
*H04L 5/00* (2006.01)
*H04W 72/23* (2023.01)
*H04W 74/0808* (2024.01)

(52) U.S. Cl.
CPC ....... *H04W 72/1268* (2013.01); *H04L 5/0048* (2013.01); *H04W 72/23* (2023.01); *H04W 74/0808* (2013.01)

(58) Field of Classification Search
None
See application file for complete search history.

(56) References Cited

U.S. PATENT DOCUMENTS

| | | | |
|---|---|---|---|
| 2016/0344526 A1* | 11/2016 | Fan | H04W 72/21 |
| 2017/0289869 A1 | 10/2017 | Nogami et al. | |
| 2018/0070369 A1* | 3/2018 | Papasakellariou | H04W 72/20 |
| 2020/0137780 A1* | 4/2020 | Kim | H04W 72/0453 |
| 2021/0204260 A1* | 7/2021 | Liu | H04L 5/0035 |
| 2022/0053541 A1* | 2/2022 | Lei | H04W 72/23 |

FOREIGN PATENT DOCUMENTS

| | | |
|---|---|---|
| WO | 2018006248 A1 | 1/2018 |
| WO | 2020062011 A1 | 4/2020 |

OTHER PUBLICATIONS

International Search Report and Written Opinion, mailed on Nov. 1, 2019, for International Application No. PCT/CN2019/075109, filed on Feb. 14, 2019 (6 pages).

Lenovo et al., "Frame structure for NR-U," 3GPP TSG RAN WG1 Meeting #95, Spokane, U.S.A., R1-1812779, 5 pages, Nov. 12-16, 2018.

(Continued)

*Primary Examiner* — Srinivasa R Reddivalam

(74) *Attorney, Agent, or Firm* — Perkins Coie LLP

(57) ABSTRACT

Methods, systems, and devices related to digital wireless communication are described. An illustrative method of wireless communication includes receiving information regarding uplink transmission. The information includes multiple transmission resources scheduled by control information and multiple candidate starting locations in the multiple transmission resources. The method further includes performing a channel access procedure at one of the multiple candidate starting locations, and in response to a result of the channel access procedure, transmitting data via the transmission resources.

19 Claims, 10 Drawing Sheets

(56) References Cited

OTHER PUBLICATIONS

NTT Docomo, Inc., "Discussion on channel access framework for potential LAA UL," 3GPP TSG RAN WG1 Meeting #82bis, Malmo, Sweden, R1-155900, 5 pages, Oct. 5-9, 2015.
European Search Report for EP Patent Application No. 19915427.9, dated Jan. 27, 2022, 14 pages.
Huawei, et al., "Feature lead summary of HARQ enhancement in NR-U," 3GPP TSG RAN WG1 Meeting #95, R1-1814146, Spokane, USA, Nov. 12-16, 2018, 15 pages.
Nokia, et al., "On support of UL transmission with configured grants in NR-U," 3GPP TSG RAN WG1 Meeting #AH-1901, R1-1900262, Taipei, Taiwan, Jan. 21-25, 2019, 5 pages.
ZTE, "Discussion on scheduling and HARQ for NR-U," 3GPP TSG RAN WG1 Meeting #95, R1-1812437, Spokane, USA, Nov. 12-16, 2018, 5 pages.
ZTE, et al., "Discussion on scheduling and HARQ for NR-U," 3GPP TSG RAN WG1 Ad-hoc Meeting, R1-1900102, Taipei, Jan. 21-25, 2019, 4 pages.
European Communication pursuant to Article 94(3) EPC issued in EP Patent Application No. 19915427.9, dated Dec. 14, 2023, 8 pages.

\* cited by examiner

DATA TRANSMISSION

CROSS-REFERENCE TO RELATED APPLICATIONS

This application is a continuation of and claims priority to International Patent Application No. PCT/CN2019/075109, filed on Feb. 14, 2019, the contents of which are incorporated herein by reference in their entirety.

TECHNICAL FIELD

This patent document is directed generally to digital wireless communications.

BACKGROUND

Using unlicensed carriers to transmit data can increase the utilization rate of available transmission resources. To improve efficiency of data transmission, channel access procedure and control signaling need to be considered. It is also important for a communication system to support flexible data transmission such as using unlicensed carriers for transmitting uplink data.

BRIEF SUMMARY

This document relates to methods, systems, and devices related to digital wireless communication, and more specifically, to mechanisms for indicating uplink transmission.

In one exemplary aspect, a method of wireless communication is disclosed. An illustrative method of wireless communication includes receiving information regarding uplink transmission. The information includes multiple transmission resources scheduled by control information and multiple candidate starting locations in the multiple transmission resources. The method further includes performing a channel access procedure at one of the multiple candidate starting locations, and in response to a result of the channel access procedure, transmitting data via the transmission resources.

In another exemplary aspect, an apparatus for wireless communication that is configured or operable to perform the above-described methods is disclosed.

In yet another exemplary aspect, the above-described methods are embodied in the form of processor-executable code and stored in a computer-readable program medium.

The above and other aspects and their implementations are described in greater detail in the drawings, the descriptions, and the claims.

DETAILED DESCRIPTION

Figure 1:
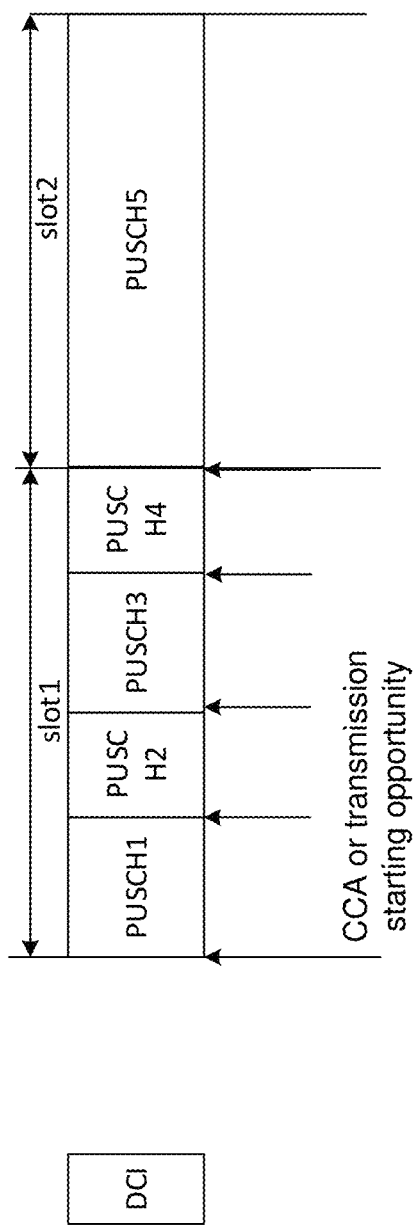
FIG. 1 illustrates an example of one downlink control information (DCI) scheduling multiple transmission time intervals (TTIs) in accordance with some embodiments.

The technology and examples of implementations in this document can be used to improve performance in multiuser wireless communication systems. The term "exemplary" is used to mean "an example of" and, unless otherwise stated, does not imply an ideal or a preferred embodiment. Section headers are used in the present document to facilitate understanding and do not limit the disclosed technology in the sections only to the corresponding section.

New radio (NR) studies of using unlicensed carrier to operate (NR-U, NR in Unlicensed Spectrum) have been researched in 3rd Generation Partnership Project (3GPP). One of the studies includes standardizing how to use unlicensed NR work deployment. According to the regulatory requirements for unlicensed operation, a device needs to perform a Clear Channel Assessment (CCA) and have a successful result prior to data transmission. To improve the probability of channel access and the efficiency of uplink transmission, multiple uplink data transmission starting points need to be supported. After a successful UE channel access, the transmission usually takes place in a plurality of continuous time slots. To implement the above data transmission, what needed to be considered include corresponding channel access procedure, control signaling design, and how to support flexible data starting points for uplink data.

When using unlicensed carriers, NR systems need to address following issues. First, in some countries and regions, there are regulatory policies for the use of unlicensed spectrum. For example, a device must perform a Listening Before Calling (LBT) procedure (also called CCA) before sending data via an unlicensed carrier. As another example, Alternatively, a channel access procedure may be required, which means only devices with successful CCA can send data on the unlicensed carrier.

Currently, two types of CCA mechanisms are standardized for uplink transmission of existing device access (LAA, LTE Assisted Access). One is type-1 CCA mechanism with random back-off. This type corresponds to multiple access priority classes for different channels. The other is a type-2 CCA mechanism without random fallback. This type includes performing a carrier sensing for a predefined duration. All data transmission by a UE, including transmission scheduled by a base station and autonomous uplink transmission (grant-free transmission or configured grant transmission), and transmission prior to feedback HARQ-ACK (Hybrid Automatic Repeat Request-Acknowledgement) for downlink transmission, require a similar channel access procedure.

Existing Release-15 NR supports time slot aggregation scheduling. It uses one DCI to schedule multiple time slots. The time domain resource locations of these time slots are the same in a time slot. These time slots transmit different redundancy versions of the same Transport Block (TB). For an unlicensed carrier, if the time domain resources on the multiple aggregate time slots are not continuous (there are vacant symbols in-between), the UE may not be able to continuously transmit after a successful CCA, such that the channel may be lost, which defeats the purpose of using unlicensed carriers based on aggregation scheduling.

Although the original LAA has standardized multiple subframes to be scheduled by one DCI, only one PUSCH (Physical Uplink Shared Channel) is scheduled per subframe. Since the NR introduces a scheduling unit of non-complete slot, the NR-U needs to consider (1) scheduling multiple PUSCHs in one slot, (2) how to support multiple TTIs in PUSCHs for CBG (Code Block Group) scheduling transmission, (3) starting point and end point indications in PUSCHs, and (4) how the first TTI transmits data and so on. In addition, issues related to how to perform channel access (CCA) procedures for multiple TTIs also needs to be considered.

The disclosed technology is directed to methods for multiple TTI transmission via PUSCHs. In some embodiments, the multiple TTI transmission is a scheduled transmission of multiple mini-slots or combinations of mini-slots and regular slots. The disclosed technology also considers CCA mode, CBG transmission indication, and multiple starting points and ending points. Details such as initial TTI partial time slot PUSCH transmission are also considered.

Further, the multiple TTI transmission is one-DCI or multiple-DCI scheduled PUSCH transmission and is a configured grant uplink transmission.

Inventive Aspect 1: CCA

This embodiment describes a channel access procedure design for continuous uplink transmission during a plurality of consecutive TTIs. The continuous uplink transmission relates to CCA methods performed for scheduling uplink PUSCH transmission and configured grant uplink PUSCH transmission in the consecutive TTIs. In different embodiments (as the cases described below), the CCA method can vary.

Case 1:

Multiple consecutive TTIs are scheduled by one DCI, and there is only one channel access type and access priority class indication.

As shown in FIG. 1, one DCI schedules five PUSCHs. A UE performs CCA according to the CCA type and channel access priority class indicated by the signaling from the first several symbols starting from the first scheduled TTI (PUSCH1). If the CCA fails, the UE will perform CCA again based on the CCA type and channel access priority class indicated by the signaling prior to the next scheduled TTI (PUSCH2). If successful, the scheduled data is transmitted from the second candidate starting position or the second scheduled TTI. If it fails, the CCA is performed again prior to the third scheduled TTI (or the third candidate starting position), and so on. Once the CCA is successful, the data corresponding to the remaining scheduled TTIs are continuously transmitted.

When the continuous TTI transmission exceeds the MCOT (Maximum Channel Occupancy Time), the UE stops transmitting and then performs channel sensing. When the channel is sensed to be idle, the type-2 channel access procedure is adopted before the next scheduled transmission TTI. When the channel is sensed to be busy, type-1 channel access procedure is adopted before the next scheduling transmission TTI, and a corresponding channel access priority class is determined based on indication from DCI or can be semi-statically configured.

Case 2:

Multiple TTIs are continuously scheduled corresponding to multiple DCI, and the channel access parameters or channel access priority classes in the DCI are different.

Assume that the DCI scheduling adopts type-1 channel access procedure in TTI(n) data transmission, and the corresponding access priority class is P1. At this time, before the TTI(n), the UE is performing a channel access procedure with access priority class of P2 (P2 is greater than P1). Then the UE can access channel to transmit PUSCH through the access priority class of P2. When P1 is smaller than P2, the UE terminates the channel access procedure in which the ongoing channel access priority class is P1.

Figure 2:
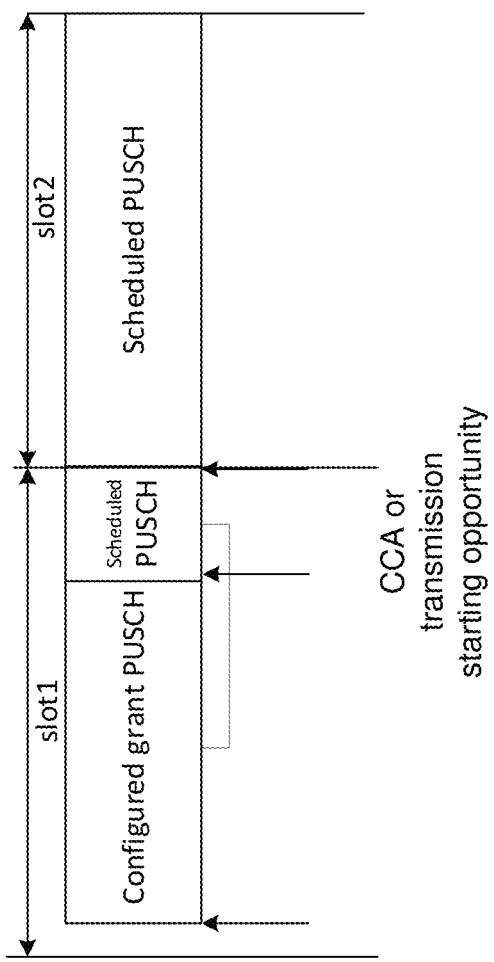
FIGS. 2-4 illustrate example DCIs for multiple TTIs in accordance with some embodiments.

Case 3:

In this case, TTIs are continuous, autonomous transmission TTIs and PUSCH transmission is scheduled, as shown in FIG. 2.

Assume that the UE performs autonomous data transmission in TTI(n) by an access procedure with channel access priority class P1. At the same time, a signaling for PUSCH scheduling indicates that the PUSCH scheduling in the next time interval, TTI (n+1), has access priority class is P2, and P2 is less than or equal to P1. In this embodiment, the autonomous transmission will always be sent to the scheduled starting PUSCH symbol position, regardless of an ending autonomous transmission symbol position that is semi-statically configured. Moreover, the length of total autonomous transmission plus the scheduled PUSCH time length does not exceed MCOT. Otherwise, the UE terminates the autonomous transmission prior to the scheduled PUSCH transmission and performs channel access in accordance with the indicated channel access priority class.

Figure 3:
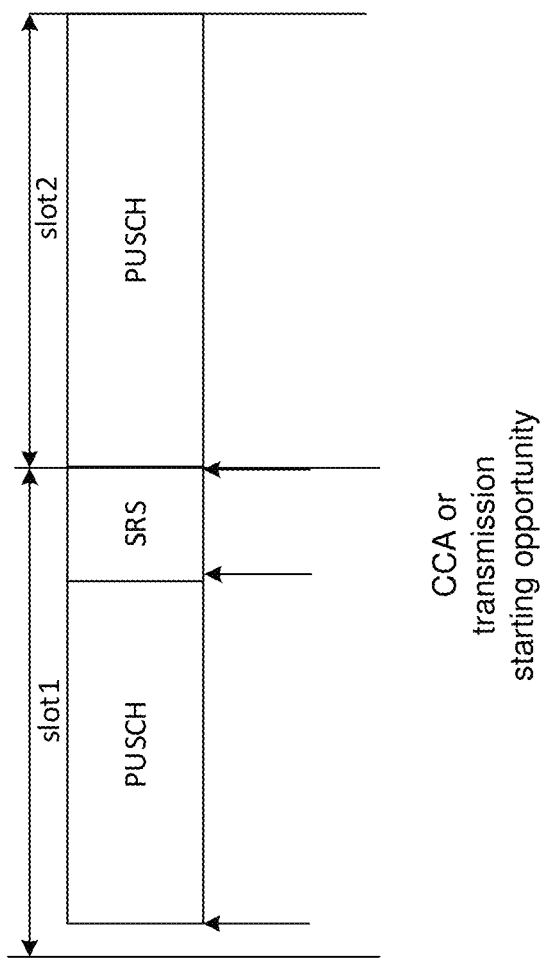

Case 4:

When the scheduled PUSCH and SRS (Sounding Reference Signal) are transmitted together, as shown in FIG. 3.

In this case, the CCA mode of the UE is:

If the UE does not succeed in performing the CCA before the PUSCH transmission, the UE can perform the CCA based on an SRS transmission mode, and only transmit the SRS after a successful CCA. The UL channel access type and priority class used for SRS transmissions are predefined. If the CCA is successful before the PUSCH transmission, the PUSCH transmission is sent along with the SRS.

Inventive Aspect 2: Multiple Flexible Starting Point Transmissions

To improve efficiency of uplink transmission, multiple starting positions in one or multiple slot(s) are allowed for PUSCH(s) scheduled by a single UL grant and one of the multiple PUSCH starting positions can be decided depending on CCA outcome. A UE can support multiple flexible starting points in two ways (e.g., Manner 1 and Manner 2 described below), and allow data to be transmitted later than the starting point of the signaling indication.

Manner 1: A PUSCH has Multiple Starting Points (or Starting Symbols) for Transmission and Supports Partial PUSCH Transmission.

Figure 4:
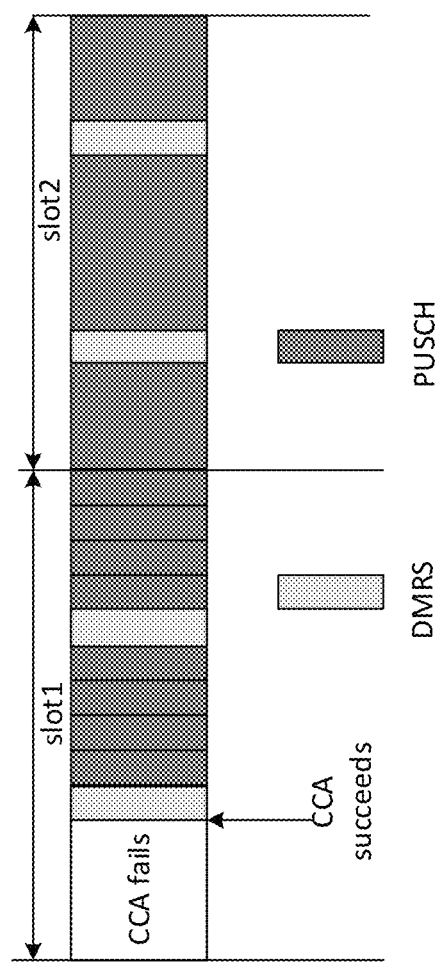

A PUSCH starting symbol can be predefined, semi-statically configured, or include a plurality of candidate starting symbol positions indicated by DCI signaling. The transmission structure of the first partial PUSCH is in resource mapping type B mode, namely, it has DMRS (Demodulation Reference Signals) and data. A base station determines the starting symbol position through the DMRS, as shown in FIG. 4.

In some embodiments, the time domain location of the DMRS is determined based on the results of the LBT, but the sequence initialization is generated based on a predefined or semi-statically configured slot number and symbol index.

Further, the first TTI that is actually transmitted in multiple TTIs is transmitted in a resource mapping manner by using resource mapping type B. The subsequent TTI transmission is transmitted by using resource mapping type A.

In this case, multiple starting positions are allowed for PUSCH transmission and single PUSCH for the first TTI is prepared by UE. When the starting symbol of the actual data transmission is not the predefined or semi-statically configured or indicated symbol, the UE uses a punctured manner to transmit the data originally prepared. The "punctured" symbol can be the symbols in front of the scheduling PUSCH or can be data that is end of the scheduling PUSCH.

Further, when the PUSCH symbol length is less than or equal to 3, Uplink Control Information (UCI) transmission is not supported.

Manner 2: One DCI Schedules PUSCHs of Multiple TTIs, and the Starting Point of Each TTI is a Candidate Initial Transmission Position.

In this embodiment, the starting point of a TTI can be a candidate starting transmission location. The number of symbols per PUSCH can be a predefined length, such as 2, 4, 8, 10, or 12 (e.g., symbols). The base station provides the number of scheduled TTIs in the DCI, as well as the length of the starting symbol of the first TTI and of the length of last TTI symbol.

The UE selects the scheduled TTI for final transmission according to the result of the CCA. For example, if a scheduled TTI is missed, then the UE only transmits the later scheduled TTI, as described above with reference to FIG. 1.

In some embodiments, for uplink transmission of a configured grant, the base station can configure different initial transmission point sets for different UEs. For example, assume that Subcarrier Spacing (SCS) is "30 k Hz," the point set can include symbol "0" and the symbol "1" or other suitable symbols divided into multiple starting points with equal intervals therebetween. For example, the starting points in symbol "0" can include {16 us, 25 us, 34 us}, and the starting points in symbol "1" can include {25 us, 34 us}. The UE can select the starting symbol positions by itself and notify the base station through the UCI.

Inventive Aspect 3: Multiple Data Transmission Starting and Ending Points (Length) Indications This inventive point describes how to instruct multiple data transmission starting and ending points (or the starting points and the length therefrom to the ending points), by using one DCI to schedule a plurality of TTIs (as discussed in the embodiments above in the Inventive Point 2 section, Manner 2).

The multiple data transmission starting points can be indicated by the following steps. The multiple data transmission starting points can be indicated through existing time domain resource allocation domain. In some embodiments, however, certain definitions may need to be adjusted. The starting point in the signaling can only be used for the first scheduled TTI or the actually transmitted TTI. The ending point (e.g., which can be determined by the starting point and the length) in the signaling can be used for the last scheduled TTI. The signaling from the starting point to the ending point is continuous. When the total length of multiple TTIs crosses multiple time slots (e.g., first and second time slots), the first TTI can be predefined to be transmitted to the last symbol of a first time slot. The last TTI can, by default, be transmitted from the first symbol of the second time slot. The intermediate TTIs can be transmitted, by default, using a complete time slot.

For embodiments where a PUSCH can include a plurality of data transmission points (as described in the Inventive Point 2 section, Manner 1), the instructions can be given based on the steps below.

The DCI can indicate a corresponding PUSCH transmission mode, and the transmission mode is one of a plurality of transmission modes of a semi-static configuration. Each transmission mode can include: a PUSCH starting point and an ending point or a symbol length. In some embodiments, symbol "7" can be a default starting position that can be used for data transmission. That is, when the UE does not succeed in channel access before the symbol indicated by DCI, the UE can re-attempt channel access before symbol "7." In some embodiments, a PUSCH can have multiple starting points and only one ending point.

Inventive Aspect 4: CBG Transmission Signaling Indication

When a certain carrier is configured for a CBG scheduling transmission, the DCI corresponding to different TB s for each TTI transmission of multiple TTIs can be designed as a specific CBGTI (Code Block Group Time Interval) scheduling information for each data channel corresponding to the scheduled TTI.

The CBGTI information corresponding to multiple TTIs can be carried by a single DCI, or can be carried by a DCI with other scheduling information by using a compression mechanism. In some embodiments, the compression mechanism can be described as follows. When a certain TTI is scheduled to be a new data packet, (that is, when a new data indicator, NDI, is reversed), the PUSCH corresponding to the HARQ procedure can be a TB-based scheduling. In some embodiments, the TTI can have no corresponding CBGTI information. In some embodiments, each CBGTI information given by one DCI for scheduling PUSCH can correspond to a scheduled PUSCH bitmap.

Inventive Aspect 5: How UE Transmits HARQ-ACK for PDSCH(s)

This embodiment discusses, when a UE fails to perform HARQ-ACK feedback, how to determine whether to let a base station to trigger HARQ-ACK feedback retransmission or let the UE to autonomous report the HARQ-ACK.

In some embodiments, the value of a timer can be semi-statically configured, and the timer can start from the location of slot "n" of the HARQ-ACK transmission indicated by the signaling. If the UE receives the triggered HARQ-ACK feedback retransmission signaling from the base station, the UE can perform channel access and retransmission of the HARQ-ACK based on timing relationship of the trigger signaling or the slot position indicated by the trigger signaling.

In some embodiments, if the timer expires and the UE still does not receive the trigger signaling from the base station to trigger the HARQ-ACK retransmission (due to the previous transmission failure), the UE can perform the channel access procedure itself. After a successful channel access, the UE can send the HARQ-ACK information that was not sent out last time. In some embodiments, configured PUCCH resources can also be sent out.

In some embodiments where the UE does not transmit the HARQ-ACK information before channel access, the UE can carry downlink HARQ procedure ID information corresponding to the feedback HARQ-ACK in the UCI, and the base station can determine, according to the ID information, which HARQ-ACK feedback retransmission the UE is performing.

In short, the present technology provides a starting point for multiple channel accesses of the UE, thereby solving the problem of low uplink channel access probability and improving uplink transmission efficiency. Details of the present technology are described below by several embodiments.

First Embodiment

This embodiment describes channel access and data transmission procedure of the UE by using continuous multiple TTIs to transmit data. The data transmission of the UE includes two types: one is unscheduled transmission, and the other is based on dynamic scheduling of the base station. For the first type of transmission, after receiving high-priority class configuration parameters sent by the base station and/or dynamically enabling the transmission mode, the UE performs the channel access procedure before the configured transmission time domain location once the data is to be sent.

Afterwards, uplink data can be sent. There are two ways to determine the CCA type for the channel access procedure: (1) method 1: using high layer signaling to semi-statically configure the channel access type and corresponding channel access priority class; and (2) method 2: using COT sharing information indicated by the base station to determine the type of channel access and the corresponding channel access priority class is semi-statically configured. When the time domain resource of the uplink channel access belongs to the COT shared resource indicated by the base station, the UE performs the type 2 channel access procedure. When the time domain resource of the uplink access does not belong to the COT shared resource indicated by the base station, the UE performs type 1 channel access procedure.

The type-1 channel access procedure includes a procedure of detecting idle channel access on multiple channels with random back-off. The type-2 channel access procedure includes a channel access procedure for a predefined detection duration.

After a successful channel access is, the uplink data can be sent. Examples of the specific data transmission procedure are discussed below in Sixth Embodiment.

The second-type of uplink data transmission is performed based on base station scheduling. The scheduled downlink control information DCI provides a channel access type indication and corresponding channel access priority class. If one DCI schedules multiple TTIs, then the DCI includes the number of scheduled TTIs, the HARQ procedure number corresponding to each TTI, the NDI, a redundancy version (RV), the CBGTI, the starting/ending points for transmission, etc.

The specific downlink control signaling design is discussed below in Third Embodiment and Fourth Embodiment. The starting point of the uplink data transmission sent by the UE can be uncertain due to the channel access procedure. To improve the access probability of uplink transmission, multiple candidate data transmission starting points can be configured or indicated, and the UE can determine which one to use based on the result of the CCA. Related examples are discussed in Fifth Embodiment below.

After the UE receives the scheduling information from the base station, the UE will no longer autonomously transmit uplink data in corresponding time domain location. On continuous time domain resources, the UE can send the scheduled PUSCH, and can also retransmit the autonomous, non-scheduled PUSCH. Under this circumstance, examples regarding the channel access procedure performed by the UE is discussed in Second Embodiment below.

In addition, examples regarding UE feedback HARQ-ACK information is discussed below in Seventh Embodiment, in which a solution is provided.

Second Embodiment

This embodiment describes a channel access procedure performed by a certain UE to continuously transmit multiple TTIs.

The channel access procedure during the multiple TTI transmission relates to whether there is one DCI scheduling and whether a configured grant transmission is included.

When a plurality of consecutive TTIs are scheduled by one DCI, the DCI includes only one channel access type indication, and the channel access priority class include one value, the UE performs channel access based on the following channel access procedure.

The UE performs CCA from the first several symbols of the first scheduled TTI. If the CCA fails, the UE re-executes the CCA before the next scheduled TTI based on the CCA type indicated by the signaling. If the CCA succeeds, then the UE starts to transmit scheduled data from a second candidate starting location or a second scheduled TTI, and so on. Once the CCA is successful, the data corresponding to the remaining scheduled TTIs are continuously transmitted, as shown in FIG. 5.

Figure 5:
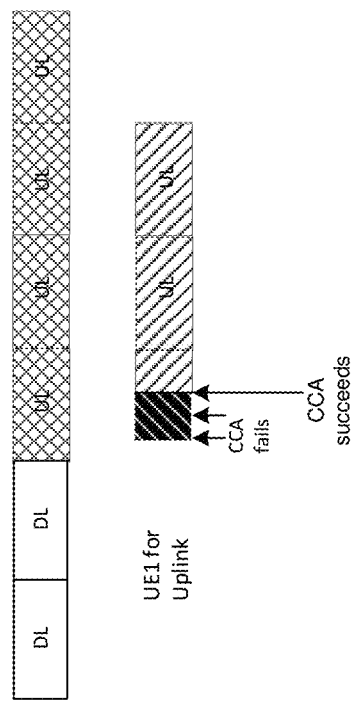
FIGS. 5-7 illustrate examples of UE transmission in accordance with some embodiments.

As shown in FIG. 5, UE1 plans to continuously transmit data during multiple time slots, and the channel access CCA is not successful before the starting point (e.g., indicated as "CCA succeeds" in FIG. 5) of the first transmission. Then UE1 performs channel access again at the second transmission point, still not successful. Then the UE continues to its third attempt, which is successful. Then the UE continuously transmits PUSCHs in multiple time slots. In some embodiments, the transmission starting point can be a plurality of symbols in one PUSCH, or multiple PUSCHs where each PUSCH corresponds to one transmission starting point.

When the continuous transmission exceeds the MCOT, the UE stops transmitting. The UE then performs channel sensing. When the channel is sensed to be idle, type-2 channel access procedure is adopted prior to the next scheduled transmission TTI. When the channel is sensed to be busy, type-1 channel access procedure of type 1 is adopted prior to the next scheduled TTI transmission, and the corresponding channel access priority class is determined based on the DCI indication or semi-statically configured.

When (1) multiple TTIs are continuously scheduled by multiple DCIs, (2) the channel access parameters in the DCIs are different, and (3) the specific channel access parameters are different, the channel access types are different (or the channel access type it the same, but the access priority classes are different), the UE performs channel access based on the following channel access procedures.

If the DCI scheduling adopts type-1 channel access procedure in TTI(n) data transmission, and the corresponding access priority class is P1. Assume that before the time before TTI(n), the UE performs channel access with access priority class P2 (where P2 is greater than P1). During the access procedure, the UE can perform channel access to transmit the PUSCH with access priority class P2.

When P1 is less than P2, the UE can terminate the channel access procedure with ongoing channel access priority class P1.

When a plurality of consecutive TTIs are a combination of a configured grant autonomous transmission and a scheduled PUSCH transmission, the UE performs channel access based on the following channel access procedures.

If the UE performs autonomous data transmission through the access procedure with channel access priority class P1, and signaling indicates that PUSCH scheduled in the next TTI and that the access priority class corresponding to the channel access adopted by the PUSCH is P2 (P2 is less than or equal to P1), then the autonomous transmission is sent to the scheduled starting PUSCH symbol position, regardless of the semi-static configuration. In some embodiments, the length of the total autonomous transmission plus the scheduled PUSCH time length does not exceed MCOT. Otherwise, in some embodiments, the UE terminates the autonomous transmission prior to the scheduled PUSCH transmission and performs channel access with the indicated channel access priority class.

When the scheduled PUSCH and the aperiodic SRS, the SRS of the semi-persistent scheduling (SPS), or the periodic SRS are transmitted together, the CCA for the UE is as follows.

If the UE does not succeed in performing CCA before the PUSCH transmission, the UE can perform CCA based on the transmission mode for the SRS, and only transmit the SRS after success. If the CCA is successful before PUSCH transmission, the UE can transmit data along with the SRS.

The foregoing methods provide solutions regarding how a UE performs channel access for data transmission in consecutive TTIs with the same channel access priority class or different channel access priority classes.

Third Embodiment

This embodiment describes the design of the DCI for scheduled uplink data transmission.

The UE first receives the DCI from the base station, and then performs the channel access procedure CCA. After a successful CCA, the UE sends the data based on the indication in the DCI. The DCI for scheduling PUSCH includes at least one of the following information: type of channel access, priority of channel access, time domain allocation information (including one or more starting and ending points or lengths of scheduled data transmission), carrier indication information, BWP index information, frequency domain resource allocation information, HARQ procedure number information, NDI information, RV information, CBGTI information, DMRS (Demodulation Reference Signal) information, PTRS (Phase Tracking Reference Signal) information, CSI (channel state information) feedback request information, SRS request information, MCS (modulation coding scheme) information, scheduled TTI or PUSCH number, etc.

In some embodiments, for a single TTI or PUSCH scheduling, assume that the DCI is in "format 0_1A," then time domain resource allocation includes multiple candidate starting points for transmission or symbol positions For multiple TTI scheduling, assume that the DCI is in "format 0_1B," then the DCI includes the number of scheduled TTIs, on top of the information mentioned above. In these embodiments, the information for scheduling can include three parts.

The first part is common information of all scheduled TTIs. Such information includes at least one of the following: carrier indication information, BWP index information, frequency domain resource allocation information, and MCS information.

The second part is information for individual TTIs, and such information includes at least one of the following: NDI information, RV information, and CBGTI information. In some embodiments, the NDI can be 1 bit for each TTI and can be mapped to the scheduled TTIs by a bitmap. In some embodiments, the RV information can be 1 bit for each TTI, and the value can be "0" or "3." Embodiments of the CBGTI information are discussed below in detail in Fourth Embodiment.

The third part is specific information applied to only one certain scheduled TTI, and such information includes at least one of the following: HARQ procedure number information, DMRS information, PTRS information, CSI feedback request information, SRS request information, a starting symbol, an ending symbol, a candidate starting symbol, etc. The information can be used to indicate which scheduled TTI can be used to transmit the reference signal SRS or PTRS or CSI feedback for the UE. The HARQ procedure number information can be used only for one TTI. The procedure ID of the remaining TTI can be determined by adding one. Embodiments of the starting symbol and the ending symbol are described in detail in Fifth Embodiment below.

Through the above signaling design, one DCI can be configured to schedule multiple TTIs, and each TTI can transmit 1-14 symbols. By this arrangement, the overhead for scheduling DCI is reduced and the probability of uplink transmission is increased.

Fourth Embodiment

This embodiment describes examples where a plurality of TTIs are scheduled at a time, and the plurality of TTIs involve a CBG scheduling. When the multiple TTIs are scheduled through one DCI, examples are as follows.

Case1: When a carrier is semi-statically configured for TB transmission there is no CBGTI bit field in the DCI, and all scheduling information is for one TB.

Case2: When a semi-statically configured carrier is scheduled for CBG transmission and each TTI is scheduled for different TB, the CBGTI is configured separately for individual TTI. When scheduling "n" TTIs, each TTI can be scheduled for "m" TBs. The maximum number of CBGs is "N" (N can be 2, 4, 6, or 8). In such embodiment, the number of bits in the DCI can be "n*m*N." Different CBGs for the same TB can be scheduled in the same TTI.

In addition, to reduce the signaling overhead, when a certain TTI is scheduled to be a new data packet (namely, when the NDI is reversed), the PUSCH corresponding to the HARQ procedure can be a TB-based scheduling. At this time, the TTI can have no corresponding CBGTI information.

Case3: When a scheduled time slot falls back from the scheduled CBG to the scheduled TB transmission, the DCI needs to be independent, and the time slot information needs to be given in the DCI to let the UE know which time slot is transferred to the TB scheduling.

This embodiment provides solutions regarding how a base station in the NR system to instruct the CBG information for each scheduled TB, when the multiple TTIs involve CBG transmissions.

Fifth Embodiment

This embodiment discusses how a UE determines the starting and ending points for each TTI transmission.

In a scheduled transmission, one DCI schedules multiple TTIs to implement multiple data transmission starting points. The starting and ending points for data transmission can be indicated as follows.

The starting and ending points can be indicated in existing DCI via the time domain resource allocation field. In some embodiments, however, certain definitions may need to be adjusted. The starting point in the signaling can only be used for the first scheduled TTI or the actually transmitted TTI. The ending point (e.g., which can be determined by the starting point and the length) in the signaling can be used for the last scheduled TTI. When the total length of multiple TTIs crosses multiple time slots (e.g., first and second time slots), the first TTI can be predefined to be transmitted to the last symbol of a first time slot. The last TTI can, by default, be transmitted from the first symbol of the second time slot. The intermediate TTIs can be transmitted, by default, using a complete time slot. Furthermore, if more than two TTIs are scheduled in one slot, a bitmap method can be used to indicate the starting position of each TTI. For example, three PUSCHs are scheduled in one slot, and "10001000010000" can be used to indicate UE the first PUSCH starting from symbol "0," the second PUSCH starting from symbol "4," and the last PUSCH starting from symbol "9."

The UE transmits the PUSCH from the latest scheduling TTI after a successful CCA, and the PUSCH corresponding to previously missed TTI is not transmitted.

The base station, based on corresponding signaling, detects the PUSCH at each corresponding TTI location. If it fails, then the base station re-schedules.

For embodiments where a PUSCH can include a plurality of data transmission points, the configuration can be indicated by the following.

The DCI can indicate a corresponding PUSCH transmission mode, and the transmission mode is one of a plurality of transmission modes of a semi-static configuration. Each transmission mode can include: a PUSCH starting point and an ending point or a symbol length. In some embodiments, symbol "7" can be a default starting position that can be used for data transmission. That is, when the UE does not succeed in channel access before the symbol indicated by DCI, the UE can re-attempt channel access before symbol "7." In some embodiments, a PUSCH can have multiple starting points and only one ending point.

In addition, a 14-bit bitmap can be defined in the DCI to indicate a specific starting symbol that can be transmitted. For example, "10010010011001" indicates that the PUSCH can start transmission from symbols 0, 3, 6, 9, 10, 13. In some embodiments, a higher layer RRC signaling can be used to configure a set of candidate starting symbol positions, and then the DCI can give a few bits to indicate the corresponding values. For example, four candidate starting symbol positions "0, 4, 8, 10" can be configured, and then 2 bits are used to indicate a specific value. The ending symbol position is fixed.

Figure 6:
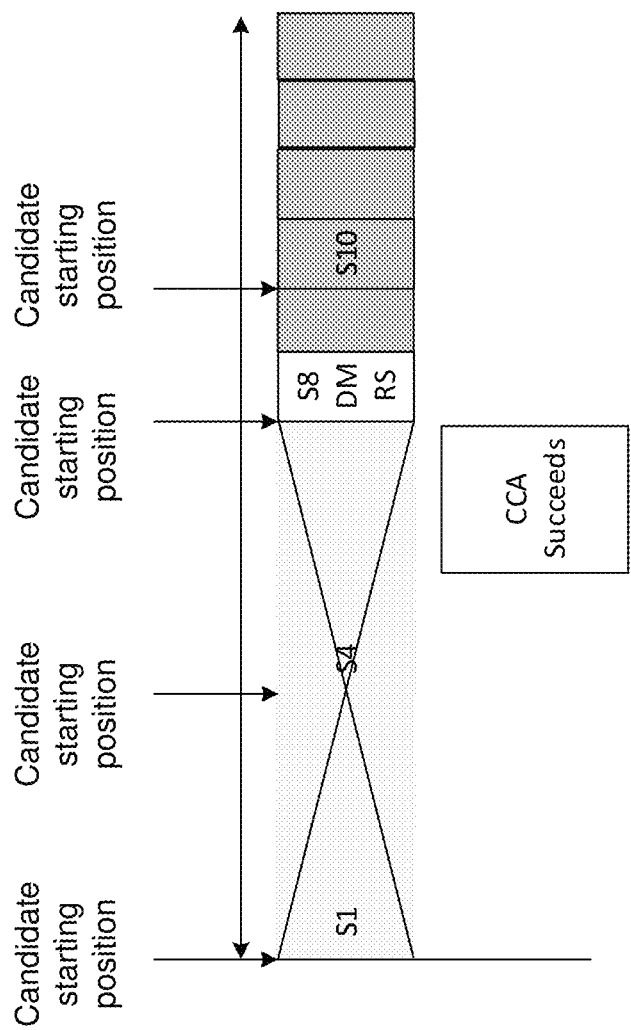

The UE first performs CCA before symbol "0." After a successful CCA, the PUSCH is sent from symbol "0." If it fails, the CCA is re-executed. If it succeeds, the transmission starts from symbol "4." If it still fails, then the UE continues to re-execute the CCA, and so on. Examples of particular CCA procedures are discussed above in Second Embodiment. There are two ways for specific data transmission involving the DMRS. First, in some embodiments, the DMRS can be a predefined location or a semi-static location of the RRC signaling. Second, in other embodiments, the DMRS can be determined based on the symbol position of a successful CCA, which is dynamically changed. As shown in FIG. 6, the UE does not succeed in performing CCA before symbol "0" (S0) and symbol "4" (S4). The UE then successfully performs the CCA before symbol "8" (S8), where the DMRS is sent, followed by other data.

Sixth Embodiment

This embodiment describes transmission modes regarding non-scheduling uplink transmission.

In some embodiments, non-scheduling uplink transmission can be performed in one of the following ways.

Figure 7:
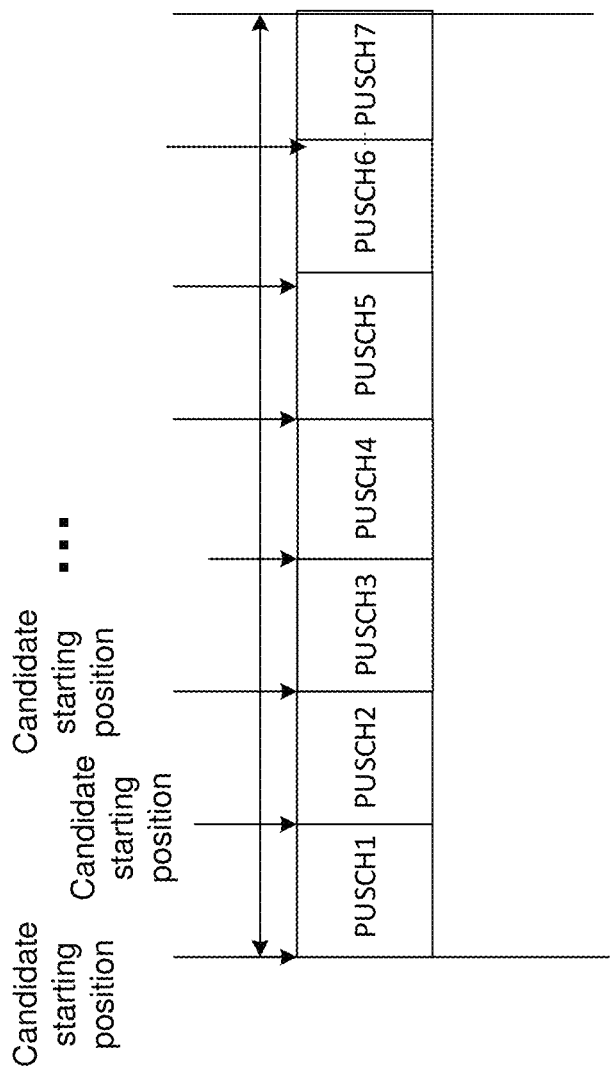

Manner 1: The UE can prepare the PUSCH according to the granularity of every two symbols. That is, the UE can prepare multiple PUSCHs to be transmitted, and each PUSCH includes two symbols. Depending on where the channel access succeeds, the UE then determines the PUSCH to transmit data. In some embodiments, the UE can select the PUSCHs that are closest to (and after) the CCA success. In some embodiments, the PUSCH can be transmitted as a whole (e.g., no partial or cancelled PUSCH). For the PUSCHs before the CCA success, in some embodiments, the UE can abandon the transmission, as shown in FIG. 7, Manner 2: The data transmission is performed based on mapping type-B. That is, the DMRS is front loaded, and then the data. If the number of the PUSCHs exceeds 4, an additional DMRS is also included. For the PUSCH including the UCI, the UCI starts from the first symbol after the front loaded DMRS, the first time domain is mapped in the time domain, and then the data is rate-matched based on the remaining resources. The ending point of the uplink data transmission is fixed. The UE transmits the data of the original time slot prepared by the UE in a "punctured" manner, and the symbol that is punctured can be a symbol segment preceding the PUSCH or a data segment following the PUSCH. Accordingly, the base station can receive data by non-scheduling PUSCH based on the DMRS location froth the blind detection.

Seventh Embodiment

This embodiment describes a procedure in which a UE provides feedback HARQ-ACK information.

High layer signaling configures a timer (for example, 5 ms in size), and the timer starts from the location of slot "n" of the HARQ-ACK transmission indicated by the signaling. If the UE does not successfully transmit the HARQ-ACK in the slot "n" (due to the failure of the channel access procedure), the timer is started.

If the UE receives trigger signaling from the base station within the timer, the UE performs the HARQ-ACK transmission based on the timing relationship of the trigger signaling or the slot position indicated by the trigger signaling.

If the timer expires, the UE still does not receive the trigger signaling from the base station to trigger the HARQ-ACK transmission, the UE performs the channel access procedure itself. After the success, the UE sends the HARQ-ACK information that was not sent out last time. The configured PUCCH resource is then sent out.

In embodiments where the UE does not have the HARQ-ACK information that can be transmitted before the channel access is transmitted, the UE can carry the HARQ procedure number information corresponding to the HARQ-ACK in the UCI. There are two ways to do so.

Manner 1: The first 4 bits can be used to indicate one HARQ procedure number and then 1 bit can be used to indicate the corresponding ACK/NACK (Negative Acknowledgement). Then there is another HARQ procedure number, followed by a 1-bit corresponding ACK/NACK.

Manner 2: The 16-bit ACK/NACK corresponding to 16 HARQ procedures can be defined and corresponded based on a bitmap.

Figure 8:
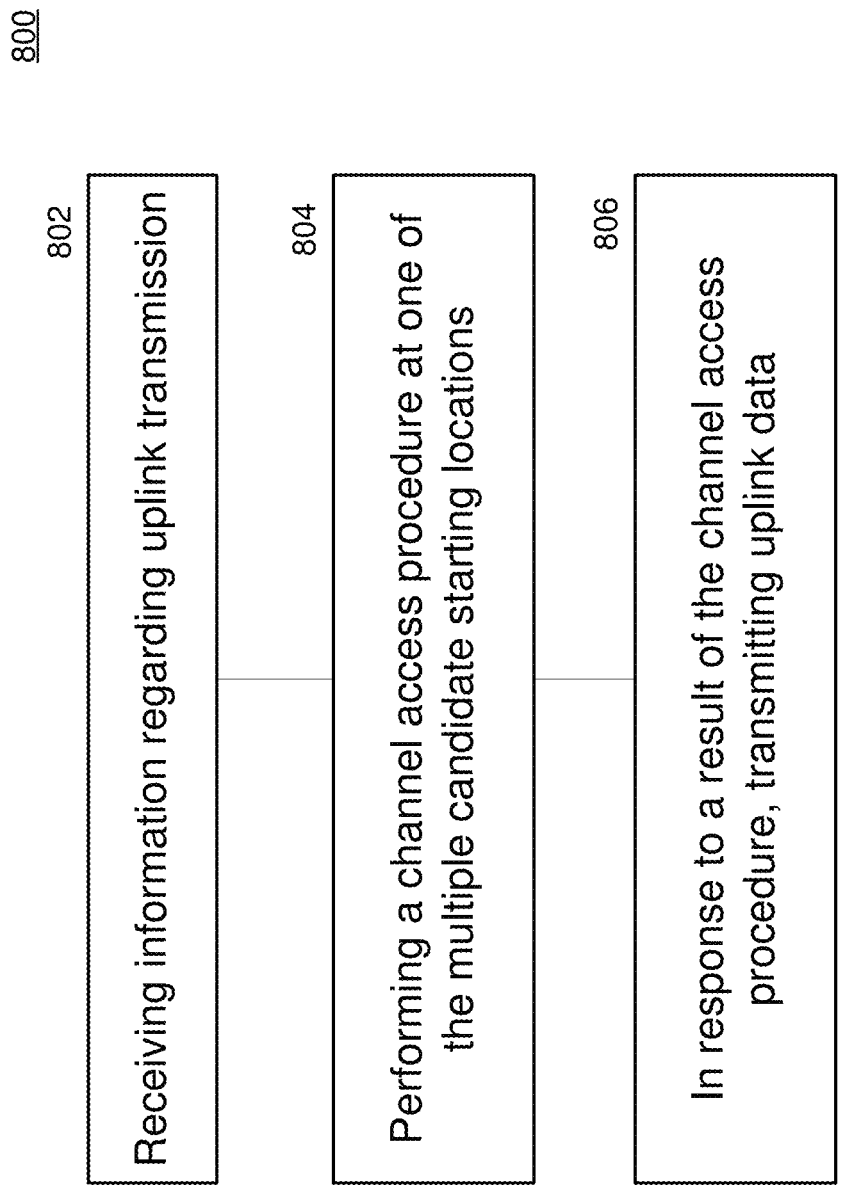
FIG. 8 is a flowchart for an example method of wireless communication.

FIG. 8 shows a flowchart of an example method 800 of wireless communication. As shown in FIG. 8, the method 800 includes, at block 802, receiving information regarding uplink transmission. In some embodiments, the information regarding uplink transmission is received by a user equipment. In some embodiments, the information includes multiple transmission resources scheduled by control information. In some embodiments, the information includes multiple candidate starting locations in the multiple transmission resources.

At block 804, the method 800 further includes performing (e.g., by the user equipment), a channel access procedure at one of the multiple candidate starting locations. At block 806, the method 800 further includes, in response to a result of the channel access procedure, transmitting (e.g., by the user equipment) data via the transmission resources.

In some embodiments, the control information includes downlink control information (DCI). In some embodiments, the multiple transmission resources include multiple physical uplink shared channels (PUSCHs).

In some embodiments, the method 800 further includes retrieving the information regarding transmission from the DCI. In some embodiments, the method 800 further includes receiving the information regarding transmission by a higher layer signaling. In some embodiments, the higher layer signaling includes Radio Resource Control (RRC) signaling.

In some embodiments, the information includes information indicative of one or more DCI-scheduled, mapping-type-B PUSCHs. In some embodiments, the information includes multiple candidate starting locations in the one or more mapping-type-B PUSCHs.

In some embodiments, the method 800 further includes (1) performing the channel access procedure at a first candidate starting location of the multiple candidate starting locations; and (2) performing the channel access procedure at a second candidate starting location of the multiple candidate starting locations, when the channel access procedure at the first candidate location is not successful.

In some embodiments, the data can be uplink data. In such embodiments, the method 800 further includes transmitting the uplink data at a location in the transmission resources later than the first candidate starting location. In some embodiments, the method 800 further includes determining (e.g., by the user equipment) a starting location in the transmission resources to transmit the uplink data based on the result of the channel access procedure.

In some embodiments, the starting location in the transmission resources can be a location where the channel access procedure is successfully performed. In such embodiments, the method 800 further includes transmitting a Demodulation Reference Signal (DMRS) at the nearest symbol, wherein the channel access procedure is successful.

In some embodiments, the channel access procedure can include implementing, by the user equipment, a Clear Channel Access (CCA) procedure prior to a first scheduled transmission time interval (TTI). In some embodiments, the channel access procedure can include, when the CCA procedure is successful, transmitting the data in the first scheduled TTI. In some embodiments, the channel access procedure can include, when the CCA procedure is not successful, implementing the CCA procedure prior to a second scheduled TTI.

In some embodiments, the method 800 further includes (1) transmitting the data via the transmission resources in multiple TTIs; and (2) stopping transmitting the data via the transmission resources when a total transmission time determined based from the multiple TTIs exceeds Maximum Channel Occupancy Time (MCOT). In some embodiments, the method 800 can further include performing a channel sensing after the user equipment stops transmitting the data, or determining whether to stop transmitting the data via the transmission resources at least partially based on a corresponding channel access priority class.

In some embodiments, the method 800 further includes transmitting the data via the transmission resources in multiple TTIs of different Transmission Blocks (TB). For a scheduled channel corresponding to one of the TB, Code Block Group Transmission Information(CBGTI) can be provided.

Figure 9:
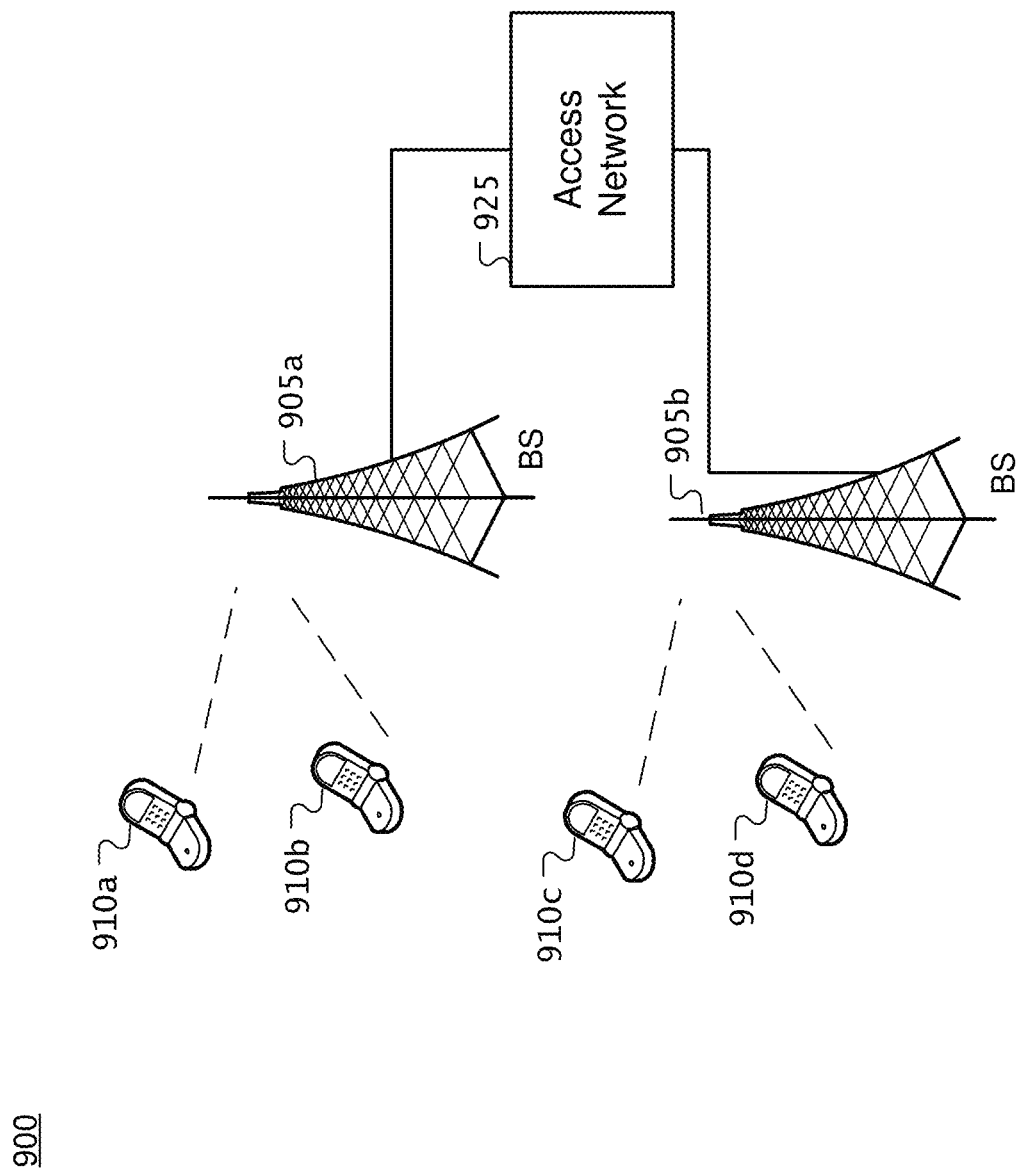
FIG. 9 shows an example of a wireless communication system.

FIG. 9 shows an example of a wireless communication system where techniques in accordance with one or more embodiments of the present technology can be applied. A wireless communication system 900 can include one or more base stations (BSs) 905a, 905b, one or more wireless devices (e.g., UEs or terminals) 910a, 910b, 910c, 910d, and an access network 925. Base stations 905a, 905b can provide wireless service to wireless devices 910a, 910b, 910c and 910d in one or more wireless sectors. In some implementations, a base station 905a or 905b includes directional antennas to produce two or more directional beams to provide wireless coverage in different sectors.

The access network 925 can communicate with one or more base stations 905a, 905b. In some implementations, the access network 925 includes one or more base stations 905a, 905b. In some implementations, the access network 925 is in communication with a core network (not shown in FIG. 9) that provides connectivity with other wireless communication systems and wired communication systems. The core network may include one or more service subscription databases to store information related to the subscribed wireless devices 910a, 910b, 910c and 910d. A first base station 905a can provide wireless service based on a first radio access technology, whereas a second base station 905b can provide wireless service based on a second radio access technology. The base stations 905a and 905b may be co-located or may be separately installed in the field according to the deployment scenario. The access network 925 can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 10:
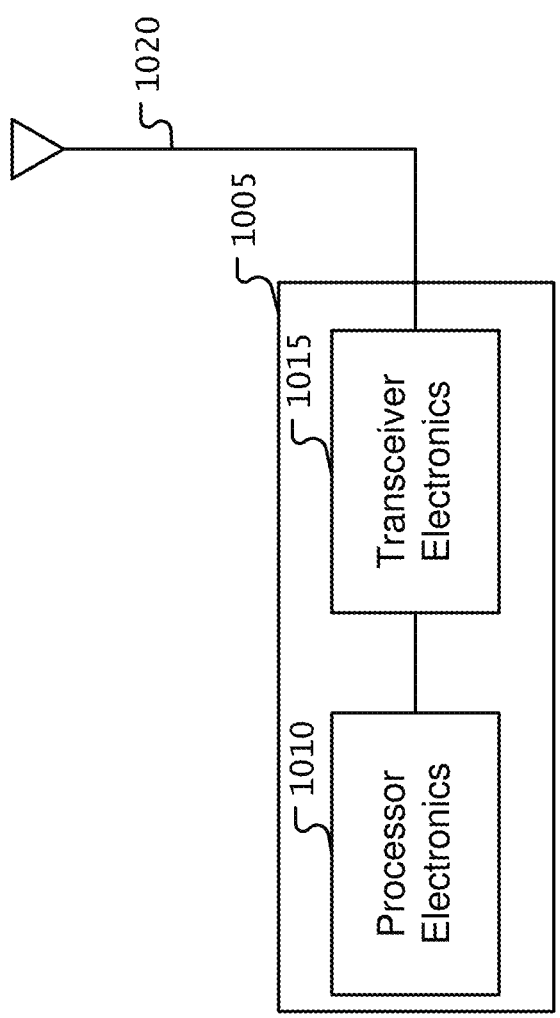
FIG. 10 is a block diagram representation of a portion of a radio station.

FIG. 10 is a block diagram representation of a portion of a radio station (e.g., a type of wireless communication node). A radio station 1005 such as a base station or a terminal (or UE) can include processor electronics 1010 such as a microprocessor that implements one or more of the wireless techniques presented in this document. The radio station 1005 can include transceiver electronics 1015 to send and/or receive wireless signals over one or more communication interfaces such as antenna 1020. The radio station 1005 can include other communication interfaces for transmitting and receiving data. The radio station 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the radio station 1005.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and nonremovable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document. From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method of wireless communication, comprising:
receiving, by a user equipment, information regarding transmission from a base station, the information including control information for scheduling multiple transmission resources in a same slot, the information including multiple candidate starting locations in the multiple transmission resources, wherein the multiple candidate starting locations are starting symbol positions within the same slot and indicated by a bitmap;
performing, by the user equipment, a channel access procedure at one of the multiple candidate starting locations;
in response to a result of the channel access procedure, transmitting, by the user equipment, data via the multiple transmission resources; and
transmitting a Demodulation Reference Signal (DMRS) at a nearest symbol to the location where the channel access procedure is successfully performed.

2. The method of claim 1, wherein the control information includes downlink control information (DCI), and wherein the multiple transmission resources include multiple physical uplink shared channels (PUSCHs).

3. The method of claim 1, further comprising receiving the information regarding transmission by Radio Resource Control (RRC) signaling.

4. The method of claim 1, wherein the multiple candidate starting locations are in one or more mapping-type-B PUSCHs.

5. The method of claim 4, wherein the channel access procedure is performed at a first candidate starting location of the multiple candidate starting locations, the method further comprising:
performing the channel access procedure at a second candidate starting location of the multiple candidate starting locations based on determining the channel access procedure at the first candidate starting location is not successful.

6. The method of claim 4, wherein the channel access procedure is performed at a first candidate starting location of the multiple candidate starting locations;
wherein the data includes uplink data; and wherein the uplink data is transmitted at a location in the multiple transmission resources later than the first candidate starting location.

7. The method of claim 1, wherein the data includes uplink data, and wherein the method further comprises:
determining, by the user equipment, a starting location in the multiple transmission resources to transmit the uplink data,
wherein the starting location in the multiple transmission resources is a location where the channel access procedure is successfully performed.

8. The method of claim 1, wherein the channel access procedure includes:
implementing, by the user equipment, a Clear Channel Access (CCA) procedure prior to a first scheduled transmission time interval (TTI); and transmitting the data in the first scheduled TTI based on determining the CCA procedure is successful.

9. The method of claim 1, wherein the channel access procedure includes:
implementing, by the user equipment, a CCA procedure prior to a first scheduled TTI; and reimplementing the CCA procedure prior to a second scheduled TTI based on determining the CCA procedure is not successful.

10. The method of claim 1, further comprising:
transmitting the data via the multiple transmission resources in multiple TTIs; and
stopping, by the user equipment, the transmitting the data via the multiple transmission resources based on determining a total transmission time based on the multiple TTIs exceeds a Maximum Channel Occupancy Time (MCOT).

11. The method of claim 1, further comprising:
wherein the data is transmitted in multiple TTIs corresponding to multiple Transmission Blocks (TBs), and
wherein the control information includes a Code Block Group Transmission Information (CBGTI) for a scheduled channel corresponding to one of the multiple TBs.

12. A method of wireless communication, comprising:
transmitting, by a base station, information regarding transmission to a user equipment, the information including control information for scheduling multiple transmission resources in a same slot, the information including multiple candidate starting locations in the multiple transmission resources, wherein the multiple candidate starting locations are starting symbol positions within the same slot and indicated by a bitmap;
based on the transmitted information and based on a successful channel access procedure at one of the multiple candidate starting locations, receiving data via the multiple transmission resources, and
receiving a Demodulation Reference Signal (DMRS) at a nearest symbol to the location where the channel access procedure is successfully performed by the user equipment.

13. The method of claim 12, wherein the information includes a channel-access type, a channel-access priority class, Code Block Group Transmission Information (CBGTI) corresponding to a physical uplink shared channel (PUSCH), a starting symbol for transmission, a starting location of transmission, candidate symbols, candidate starting points, an ending point, or a symbol length.

14. The method of claim 12, wherein the control information includes downlink control information (DCI) and radio resource control (RRC) information.

15. The method of claim 12, wherein the multiple transmission resources include multiple PUSCHs.

16. An apparatus for wireless communication comprising a transceiver and a processor, the apparatus configured to:
receive information regarding transmission, the information including control information for scheduling multiple transmission resources in a same slot, the information including multiple candidate starting locations in the multiple transmission resources, wherein the multiple candidate starting locations are starting symbol positions within the same slot and indicated by a bitmap;
perform a channel access procedure at one of the multiple candidate starting locations;
in response to a result of the channel access procedure, transmit data via the multiple transmission resources, and
transmitting a Demodulation Reference Signal (DMRS) at a nearest symbol to the location where the channel access procedure is successfully performed.

17. The apparatus of claim 16, wherein the control information includes downlink control information (DCI) and the multiple transmission resources include multiple physical uplink shared channels (PUSCHs).

18. The apparatus of claim 16, wherein the channel access procedure is performed at a first candidate starting location of the multiple candidate starting locations, and the processor is further configured to:
perform the channel access procedure at a second candidate starting location of the multiple candidate starting locations based on determining the channel access procedure at the first candidate starting location is not successful.

19. The apparatus of claim 16, wherein the data includes uplink data, the channel access procedure is successful, and the uplink data is transmitted at the one of the multiple candidate starting locations where the channel access procedure is performed.

* * * * *